(No Model.)
P. W. MacKENZIE.
PROCESS OF MANUFACTURING ILLUMINATING GAS.
No. 435,071. Patented Aug. 26, 1890.
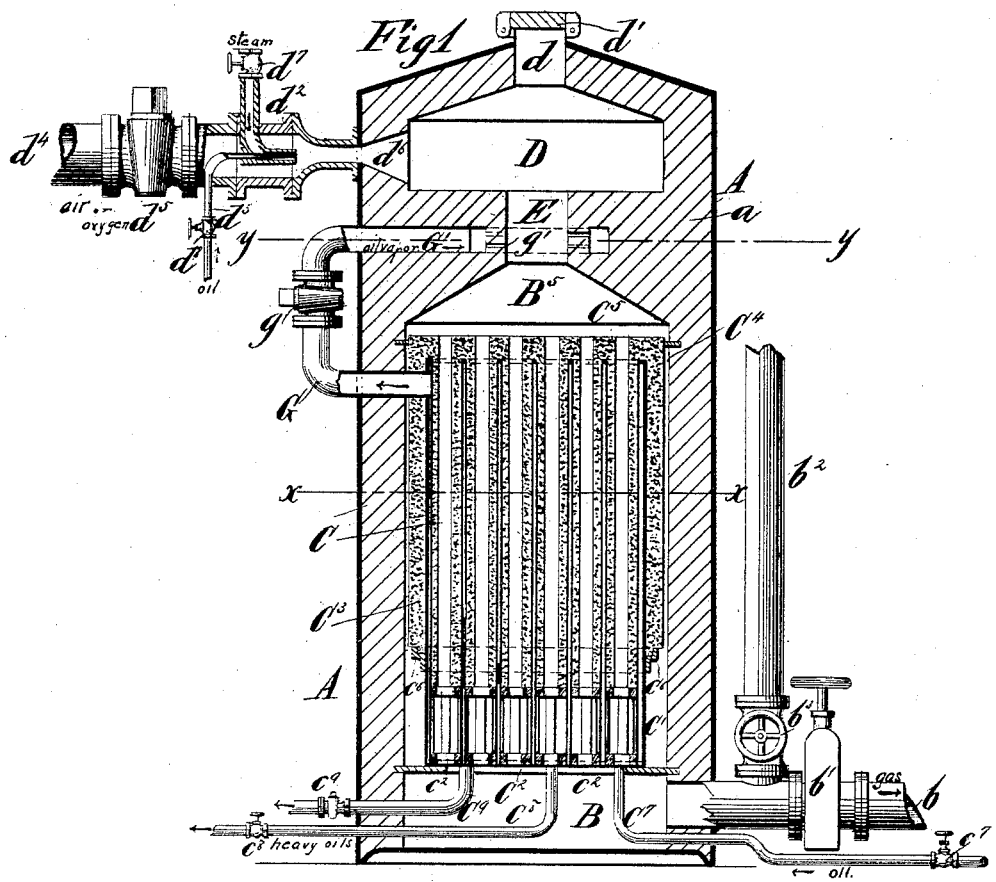
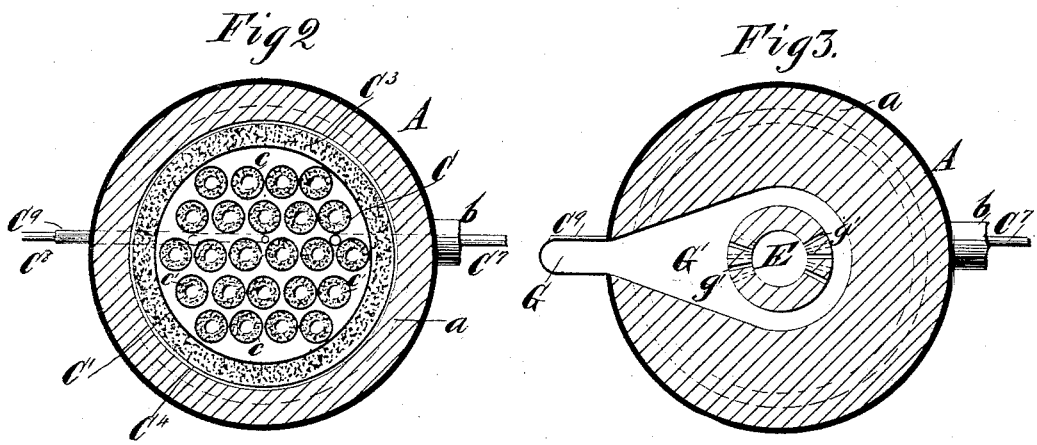
Witnesses:
John Ricket
C. Sundgren
Inventor:
Philip W. MacKenzie
by his Attorneys
Brown & Griswold

UNITED STATES PATENT OFFICE.

PHILIP W. MACKENZIE, OF NEW YORK, N. Y., ASSIGNOR TO THE FUEL GAS AND LIGHT IMPROVEMENT COMPANY OF AMERICA, OF SAME PLACE.

PROCESS OF MANUFACTURING ILLUMINATING-GAS.

SPECIFICATION forming part of Letters Patent No. 435,071, dated August 26, 1890.

Application filed December 7, 1889. Serial No. 332,943. (No specimens.)

*To all whom it may concern:*

Be it known that I, PHILIP W. MACKENZIE, of New York, in the county and State of New York, have invented a certain new and useful Improvement in Processes for the Manufacture of Illuminating-Gas, of which the following is a specification.

My invention relates to a process for the manufacture of illuminating-gas from liquid hydrocarbon water in the form of steam and oxygen or air, which gas consists particularly of hydrogen, carbonic oxide, marsh-gas, and carbon.

I will describe in detail a process embodying my improvement, and then point out the novel features in the claim, the accompanying drawings illustrating a convenient method for carrying the same into effect.

In the accompanying drawings, Figure 1 is a vertical section of apparatus embodying my improvement. Fig. 2 is a horizontal section taken on the line $x\ x$, Fig. 1. Fig. 3 is a horizontal section taken on the line $y\ y$, Fig. 1.

Similar letters of reference designate corresponding parts in all the figures.

A designates the main shell or body of the apparatus. As shown, this shell is cylindrical, and it may be made of metal. Within the shell A, and forming a lining $a$ therefor, is placed fire-bricks or any other suitable refractory material of any desired thickness. In the lower portion of the body there is formed a chamber B, into which chamber the permanent gas, after having been manufactured, is received, and from which it may be discharged through an outlet-pipe $b$, provided with a suitable valve $b'$. I have shown as extending from the pipe $b$ a stack $b^2$, provided with a valve or damper $b^3$. Above the chamber B is an evaporator and superheater C. This evaporator and superheater comprises, as here shown, a number of vertically-extending cylindrical tubes $c$, a sufficient number of such tubes being employed to nearly fill the space in which they are inclosed by the refractory material $a$. All of the tubes are inclosed in a cylindrical shell $C'$, which shell is provided with a tube-sheet at both its upper and lower ends. The tubes $c$ extend through said tube-sheets and are secured therein. I have shown the shell $C'$ as supported near its lower end upon a plate $C^2$, which plate is in turn secured in the refractory material $a$. Surrounding the shell $C'$, but stopping short of the lower end of said shell, is a casing of refractory material $C^3$, an annular space $C^4$ being left between the refractory material $C^3$ and the refractory material $a$. Refractory material $C^5$ also extends over the upper end of the evaporator and superheater C. The refractory material $C^5$, however, constitutes in effect a tube-sheet, as will be presently described. The lower end of the refractory material $C^3$ is supported, as shown, upon an annular flange $C^6$, extending about the shell $C'$ and secured to the latter. Each of the tubes $c$ is internally lined with refractory material $c'$, which material may be of fire-clay, and is of course tubular. These linings of refractory material do not extend wholly to the lower ends of the tubes $c$, but their upper ends extend beyond the upper ends of the tubes $c$ and through the apertures in the tube-sheet formed by the refractory material $C^5$. The lower ends of the refractory linings $c'$ are supported upon metallic thimbles or cages $c^2$, which thimbles or cages are driven into the lower ends of the tubes $c$. The tubes open at their lower ends into the chamber B and at their upper ends into a chamber $B^5$. Gaseous products in a highly-heated condition pass downwardly through the tubes $c$. The internal linings of refractory material protect the tubes and prevent their being quickly burned out while the refractory material $C^3 C^5$ protects the shell $C'$. The bottom of the shell $C'$ forms also the bottom of a receptacle for hydrocarbon oils. Such oils are admitted through a pipe $C^7$ provided with a cock $c^7$. The pipe $C^7$ extends upwardly for a considerable distance inside the receptacle. A pipe $C^8$ also extends into the receptacle, but terminates at its upper end at a lower level than the upper end of the pipe $C^7$. The pipe $C^8$ is provided with a cock $c^8$. A pipe $C^9$, provided with a cock $c^9$, also opens into said receptacle, but terminates at its upper end at a lower level than the upper end of the pipe $C^8$. As the volatile portions of the oil entering through the pipe $C^7$ become volatilized, the heavy non-volatile oils will sink, and the lighter oils being introduced through the pipe $C^7$ will float upon them. A further separation of the heavy oils which have thus sunk down will take place, wherein a still heavier oil, together with heavy residual products—such as tar, &c.—will sink to a still lower level. Thus there will be three bodies of oil in the receptacle, the upper or lighter, which is being volatilized, the second or lower stratum of heavy lubricating-oil, and the third, a still lower stratum of still heavier oil and residual products. The first of the lubricating-oils may be drawn off through the pipe $C^8$, while the lower stratum of heavy oils and residual products may be drawn off through the pipe $C^9$. By this means I am enabled to separate the oils and residual products consituting by-products in the manufacture of gas. These by-products may be treated subsequently for the different elements contained. The evaporation of hydrocarbon oil in the superheater, which may be utilized in the manufacture of gas, equals about seventy to ninety per cent., and the remaining portion, about ten to thirty per cent., would be taken away as by-products, as above stated. Hydrocarbon oil delivered into the receptacle fills or partly fills the space between the lower ends of the refractory linings $c'$ and the bottom of the shell $C'$, and when evaporated passes upwardly through the spaces in the shell $C'$, which are intermediate of the tubes $c$, in manner about to be described.

D designates a converter or decomposing-chamber located in the upper portion of the case or body of the apparatus. This converter is covered by a top or crown of sufficient thickness to prevent loss of heat by radiation, and is provided with an outlet $d$ upon its upper side, which may be closed by a cap or cover $d'$. Into the converter D, I inject a mixture of liquid hydrocarbon, superheated steam, and oxygen or air. I prefer to introduce this mixture by means of an injector, comprising a pipe $d^2$, provided with a cock $d^7$. The steam is preferably superheated. With the injector communicates a pipe $d^3$, provided with a cock $d^8$, and through which the liquid hydrocarbon is drawn by the entering steam. At the same time oxygen or air in suitable quantities is drawn in through a pipe $d^4$, in which is a cock $d^5$. The mixing of the hydrocarbon, steam, and air or oxygen occurs outside the converter D, and enters the latter through an opening or tuyere $d^6$ in a thoroughly-mixed condition.

In starting the apparatus the cover $d'$ is raised and the mixed hydrocarbon, steam, and air or oxygen is ignited. When thoroughly ignited, the cover $d'$ is closed and combustion then takes place in the converter. The intensely-heated products of combustion pass downwardly through a contracted neck or passage E, forming a mixing-chamber and located about centrally in the bottom of the converter and communicating at its lower end with the chamber $B^5$ about the evaporator and superheater C. At this time the valve $b'$ in the pipe $b$ is closed and the valve or damper $b^3$ in the stack $b^2$ is open. The products of combustion from the chamber F pass downwardly through the tube $c$, thence into the chamber B below the evaporator and superheater, from which they are carried off through the stack $b^2$. This preliminary operation is for the purpose of thoroughly heating the converter D and the evaporator and superheater C, and in carrying it out I prefer to use only a limited amount of steam and a certain amount of hydrocarbon.

A proper degree of heat having been obtained, I somewhat increase the supply of steam and liquid hydrocarbon. Liquid hydrocarbon is at this time admitted through the pipe $C^7$ to the receptacle in any desired quantity. The superheated hydrocarbon vapor then passes upwardly about the tubes $c$, and thence through a pipe G, provided with a cock $g$, into a vapor-chamber $G'$, surrounding the mixing-chamber E and communicating with the latter through a number of openings or tuyeres $g'$. The mixing-chamber E and vapor-chamber $G'$ constitute in effect a carbureter and carbonizer, whereby the lean gas from the converter or decomposing-chamber is enriched by the hot hydrocarbon vapors from the evaporator and superheater.

In the converter D the oxygen or the oxygen of the air and steam combine with the carbon of the liquid hydrocarbon to produce combustion and decomposition, thereby liberating the hydrogen from the steam and hydrocarbon by decomposition, whereby carbonic acid and hydrogen are produced. Additional carbon or hydrocarbon admitted through the pipe $d^3$ absorbs the oxygen from the carbonic acid, thereby forming carbonic oxide. If this additional carbon or hydrocarbon were not thus introduced, however, the carbonic acid would be absorbed while the gas from the converter was passing through the mixing-chamber E, thereby producing the same result. The highly-superheated carbon vapors from the evaporator and superheater are delivered in fine jets through the passages or tuyeres $g'$ into the hydrogen and carbonic oxide descending from the converter. The hydrocarbon vapor, by being thus thrown in atomized contact with those gases while they are incandescent or at a very high temperature, undergoes destructive distillation and is converted into a permanent gas. The highly-superheated carbon vapor may be taken from the pipe C directly into the pipe $d^3$ and the supply of liquid hydrocarbon cut off from the pipe $d^3$, if desired. The only supply of carbon will then be the vapor. When nitrogen is present or produced, as when air is used, it is neutralized by the hydrocarbon. The permanent gas is conveyed away through the pipe $b$, the valve $b'$ being of course open and the valve or damper $d^3$ of the stack being closed, and is there washed, scrubbed, purified, and otherwise treated in the usual manner. More than one injector for introducing hydrocarbon and oxygen or air to the chamber D may be used, if desired.

Although I have represented the apparatus as extending vertically so that products of combustion pass downwardly, it might of course be arranged in other positions and such products be otherwise directed.

What I claim as my invention, and desire to secure by Letters Patent, is—

The process of manufacturing gas, consisting in evaporating hydrocarbon-oil, mixing the products of such evaporation with the products of combustion of hydrocarbon oil, steam, and oxygen or air, conveying away the gaseous products resulting therefrom and fixing them, employing the fixed gas to cause the said evaporation of hydrocarbon oil and conveying away the heavy unevaporated oil and residual products at different levels below the oil being evaporated, substantially as specified.

PHILIP W. MACKENZIE.

Witnesses:
FREDK. HAYNES,
D. H. HAYWOOD.